United States Patent [19]

Spencer

[11] 3,708,784
[45] Jan. 2, 1973

[54] SWITCH INDICATOR MODULE WITH SINGLE-WIRE CONTROL

[75] Inventor: William Meyer Spencer, West End, N.J.

[73] Assignee: The Bendix Corporation

[22] Filed: Jan. 6, 1971

[21] Appl. No.: 104,338

[52] U.S. Cl............340/147 R, 340/176, 340/213 R, 340/253 R, 317/60 R
[51] Int. Cl.............................................G08b 21/00
[58] Field of Search.340/253 R, 253 A, 253 B, 147R, 340/176, 252 R, 409, 176, 253; 317/60 R, 137

[56] References Cited

UNITED STATES PATENTS 3,483,432  12/1969  Neill....................................317/60 R
3,201,754  8/1965  Reiner et al. .....................340/147 R
2,250,214  7/1941  Ashworth.........................340/252 R Primary Examiner—John W. Caldwell
Assistant Examiner—Robert J. Mooney
Attorney—S. H. Hartz and Plante, Arens, Hartz, Smith & Thompson

[57] ABSTRACT

A control circuit has control means for issuing commands to a logic circuit to provide logic signals corresponding to the commands for controlling a device. An indicator circuit controlled by a signal when the device has not responded to a logic signal operates an indicator to indicate that the device has not responded to a command.

13 Claims, 3 Drawing Figures

INVENTOR.
WILLIAM M. SPENCER
BY
ATTORNEY

SWITCH INDICATOR MODULE WITH SINGLE-WIRE CONTROL

The invention relates to circuits for controlling devices and more particularly to such circuits providing logic signals to initiate control of the devices.

The control circuit of the present application is especially adapted for use in an information transfer system of the kind shown and described in copending application Ser. No. 45,462, filed June 11, 1970, and assigned to The Bendix Corporation, the same assignee as the present application. The control circuit provides logic signals in response to commands for tripping and resetting remote controlled circuit breakers of the above application and provides an indication when a reset command is given and the circuit breaker does not respond because of an overriding signal or a malfunction in the associated circuit.

The control circuit has a manual control for initiating the commands and an associated indicator for the purpose described above which are positioned on a control panel on the flight deck. The control circuit also includes a logic circuit and an indicator circuit which are remotely situated from the manual control and indicator and only a single wire is required to connect the manual control and the indicator to the logic and indicator circuits. This is important because so many control circuits are used and the space for the manual controls and indicators is limited. Also, the logic circuit and indicator circuit may be positioned a substantial distance from the manual control and indicator.

The invention contemplates a control circuit for issuing commands to a device and for indicating whether the device has responded to a command, comprising control means for issuing the commands, a logic circuit including switching means controlled by the control means and providing logic signals corresponding to the commands for controlling the device, an indicator circuit including switching means operated by a signal when the device has not responded to a logic signal, and indicating means connected to said control means and to said indicator circuit and controlled thereby to indicate that the device has not responded to the command.

One object of the invention is to provide a circuit for issuing commands to a device and for indicating whether the device has responded to a command.

Another object of the invention is to provide a control circuit having an indicator and means for issuing commands at one location and having the remainder of the circuit at a second remote location with only a single wire connecting the equipment at the two locations.

The foregoing and other objects and advantages of the invention will appear more fully hereinafter from a consideration of the detailed description which follows, taken together with the accompanying drawings wherein several embodiments of the invention are illustrated by way of example. It is to be understood, however, that the drawings are for the purpose of illustration only and are not a definition of the limits of the invention, reference being had to the appended claims.

Figure 1:
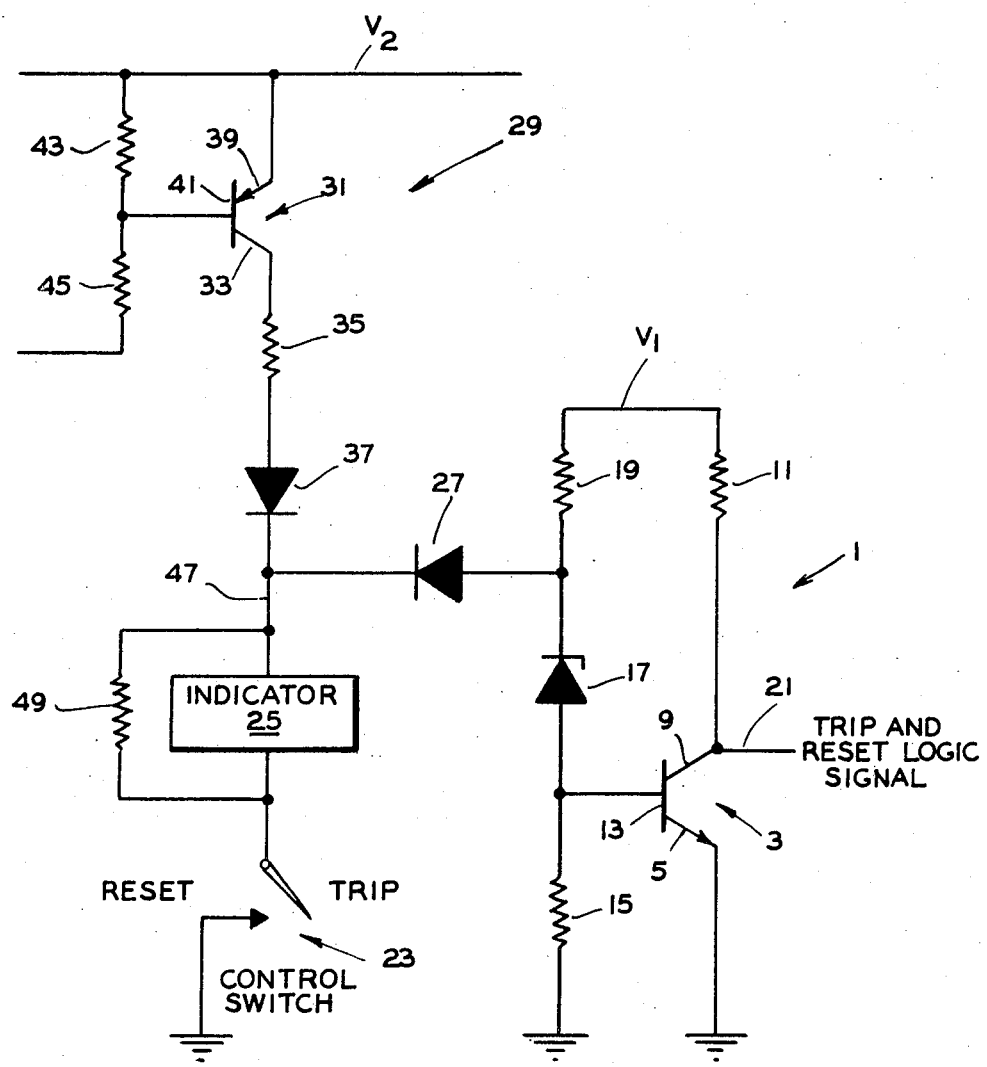
FIG. 1 is a schematic diagram of a control circuit constructed according to the invention.

In the drawing, the novel control circuit shown therein and constructed according to the invention comprises a logic circuit 1 for providing first and second logic signals corresponding to commands. When the control circuit is used with remote controlled circuit breakers as described above the logic circuit provides trip and reset logic signals for tripping and resetting the circuit breakers. Logic circuit 1 includes an NPN transistor 3 having an emitter 5 connected to ground and a collector 9 connected through a resistor 11 to a voltage source $V_1$. Transistor 3 also has a base 13 connected to ground through a resistor 15 and to voltage source $V_1$ through series connected Zenor diode 17 and resistor 19.

A diode 27 is connected to the junction of resistor 19 and Zenor diode 17. A control switch 23 movable manually between trip and reset positions is connected to an indicator 25 which may comprise a light emitting diode, a magnetic ball or a lamp or any other suitable arrangement for providing an indication. A resistor 49 is connected in parallel with indicator 25. In the trip position control switch 23 is open and in the reset position the control switch connects indicator 25 to ground. Control switch 23 and indicator 25 are connected through a single lead 47 to diode 27 of logic circuit 1. While the single lead 47 is shown as being relatively short in the diagram when the components of the control circuit are arranged in aircraft or the like the single lead may be quite long.

With the arrangement described, when control switch 23 is in the open or trip position current flows from voltage source $V_1$ through resistor 19, Zenor diode 17 and resistor 15 to ground and a biasing voltage appears on base 13 causing transistor 3 to conduct and provide a low trip logic signal on a lead 21 connected to collector 9. When control switch 23 is in the grounded reset position Zenor diode 17 is shunted to ground through diode 27, single lead 47, resistor 49 and control switch 23 so that transistor 3 is non-conducting and a high reset logic signal is provided on lead 21.

When the remote controlled circuit breaker is tripped because of a malfunction in the associated circuit or by a manual override a signal is provided to an indicator circuit 29 for the purpose described hereinafter. Indicator circuit 29 includes a PNP transistor 31 having an emitter 39 connected to a voltage source $V_2$ and a collector 33 connected through a resistor 35, diode 37 and single lead 47 to indicator 25. Transistor 31 also has a base 41 connected through a resistor 43 to voltage source $V_2$ and to a resistor 45. When a trip signal is provided because of a malfunction or override as described above, resistor 45 is connected to ground and a biasing voltage is provided on base 41 of transistor 31 because of current flow through resistors 43 and 45 to ground so that transistor 31 conducts when control switch 23 is in the reset position. Current flows from source $V_2$, through transistor 31, resistor 35, rectifier 37, single lead 47, indicator 25, and control switch 23 to ground so that indicator 25 provides an indication that the circuit breaker has not been reset as commanded by control switch 23. When the circuit breaker is able to respond to a reset command from control switch 23, resistor 45 is not grounded by a trip signal and transistor 31 is non-conducting and indicator 25 provides no indication. When control switch 23 is in the trip position the indicator circuit is open and indicator 25 provides no indication even though resistor 45 is connected to ground as described above.

Source $V_1$ may be of relatively high voltage compared to source $V_2$ to avoid noise in the logic circuit. The values of resistor 49 and resistor 19 and other components of the logic signal circuit are chosen so that current flow through indicator 25 does not provide an indication when control switch 23 is in the reset position and the associated circuit breaker has been reset. Also when indicator 25 does provide an indication in the manner described above the voltage drop across indicator 25 and the value of Zenor diode 17 must be selected so that transistor 3 does not conduct.

When the novel control circuit constructed according to the invention is used for tripping and resetting a remote controlled circuit breaker of the kind described in the above copending application and for indicating whether the circuit breaker has been reset, control switch 23 and indicator 25 preferably are located on a control panel on the flight deck and the remainder of the control circuit is remotely located and only single lead 47 is required to connect control switch 23 and indicator 25 to indicator circuit 29 and logic circuit 3. This presents a tremendous saving in weight and complexity because a thousand or more remote controlled circuit breakers may be used on aircraft and the like and each circuit breaker may be controlled by a control circuit as described herein. The control panel has limited space and it is not practical to locate the indicator circuits and logic circuits on the control panel so that it is necessary to position them in some remote place which may be some distance from the control panel.

With the arrangement described, since the trip command from control switch 25 is an open circuit, if single wire 47 opens the circuit breaker will trip in the same manner as though a trip command were given.

Figure 2:
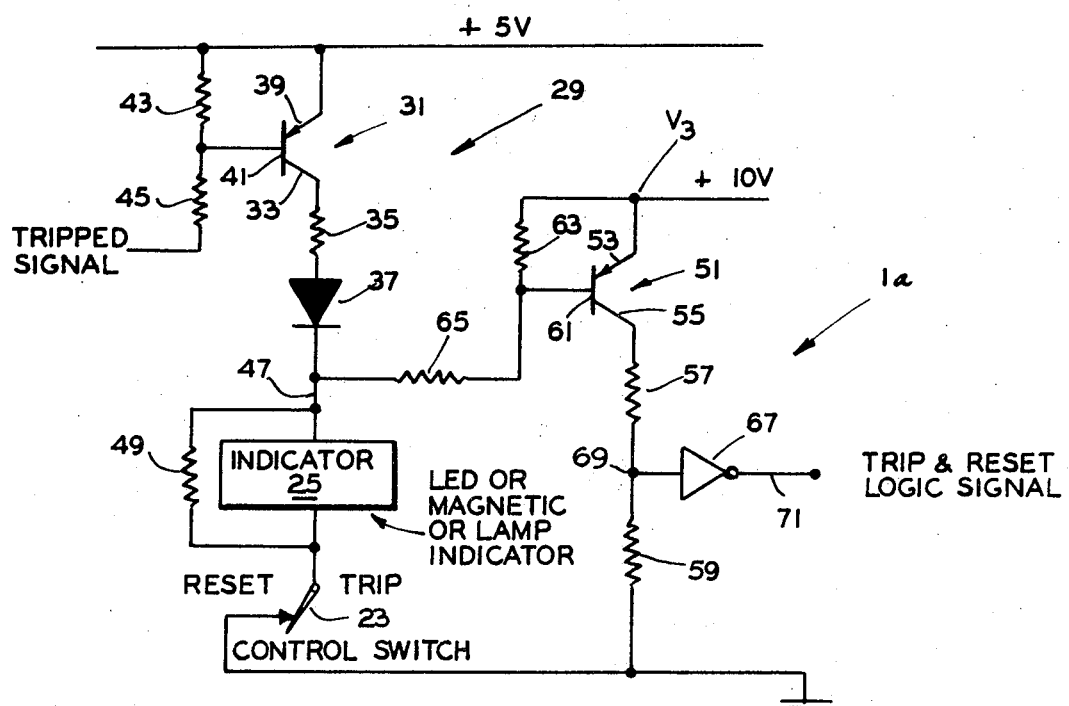
FIG. 2 is a schematic diagram of a second embodiment of the invention.

The control circuit shown in FIG. 2 is similar to the control circuit shown in FIG. 1 except for logic circuit 1a in FIG. 2 which provides a high trip logic signal and a low reset logic signal instead of a low trip logic signal and high reset logic signal as in FIG. 1. The same reference numerals are used in FIG. 2 as in FIG. 1 except for logic circuit 1a which is described below.

The logic circuit includes an PNP transistor 51 having an emitter 53 connected to a voltage source $V_3$ and a collector 55 connected through series connected resistors 57 and 59 to ground. An inverter 67 is connected to junction 69 of resistors 57 and 59 and has an output 71 for providing high trip logic signals and low reset logic signals as commanded by control switch 23. Transistor 51 also has a base 61 connected through a resistor 63 to voltage source $V_3$ and through a resistor 65 to single lead 47.

When control switch 23 is in reset grounded position current flows from source $V_3$ through resistors 63, 65, single lead 47, resistor 49 and control switch 23 to ground. Biasing voltage appears on base 61 of transistor 51 causing the transistor to conduct so that current flows through resistors 57 and 59 to ground. The signal at junction 69 of resistors 57 and 59 is high and is inverted by inverter 67 to provide a low reset command logic signal at output 71. The values of resistors 63, 65 and 49 should be chosen so that, even though source $V_3$ is relatively high voltage to avoid noise in the logic circuit, indicator 25 provides no trip indication when the circuit breaker is reset. When control switch 23 is in open trip position transistor 51 is non-conducting and juction 69 is at ground potential and inverter 67 provides a high trip command logic signal at output 71.

The indicator circuit operates in the same manner as in the embodiment of FIG. 1. It will be observed that in FIG. 2, as in FIG. 1, the trip command from control switch 23 is an open circuit so that if the single wire 47 opens the device controlled by the control circuit will respond in the same manner as if a trip command were given.

Figure 3:
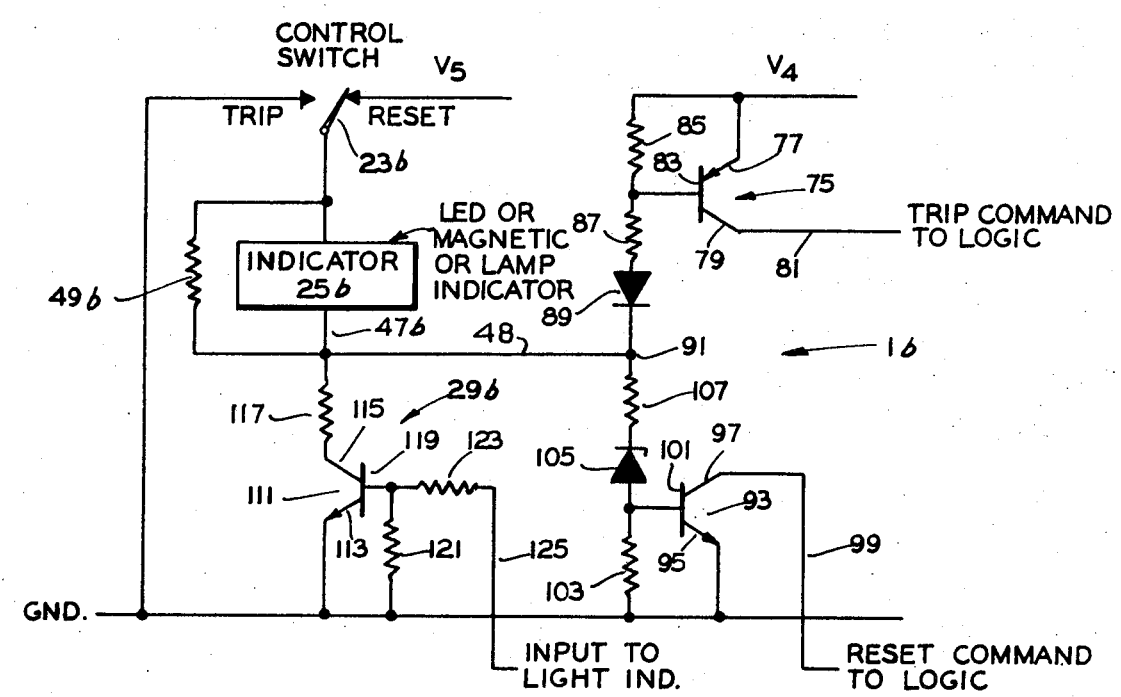
FIG. 3 is a schematic diagram of a third embodiment of the invention.

The control circuit shown in FIG. 3 includes a logic circuit 1b, an indicator circuit 29b, an indicator 25b and a control switch 23b and the control switch and indicator are connected to the logic circuit and indicator circuit by a single lead 47b.

Logic circuit 1b includes an PNP transistor 75 having an emitter 77 connected to a voltage source $V_4$ and a collector 79 connected to an output 81 for providing trip command logic signals. Transistor 75 also has a base 83 connected through a resistor 85 to source $V_4$ and through a resistor 87 and a diode 89 to a junction 91. An NPN transistor 93 has an emitter 95 connected to ground and a collector 97 connected to an output 99 for providing reset command logic signals. Transistor 93 also has a base 101 connected through a resistor 103 to ground and through a Zenor diode 105 and a resistor 107 to junction 91.

Control switch 23b is movable manually between a reset position connected to a voltage source $V_5$ and a trip position connected to ground. Control switch 23b is connected in series with a parallel connected resistor 49b and indicator 25b and single lead 47b to a lead 48 connected to junction 91 of logic circuit 1b. With the control switch in trip position current flows from source $V_4$ through resistors 85 and 87, diode 89, junction 91, lead 48, single lead 47b, resistor 49b and control switch 23b to ground. A biasing voltage appears on base 83 of transistor 75 causing the transistor to conduct and provide a high trip logic signal on output 81.

With control switch 23b, in reset position current flows from source $V_5$ through resistor 49b, single lead 47b, lead 48, junction 91, resistor 107, Zenor diode 105 and resistor 103 to ground. A biasing voltage appears on base 101 of transistor 93 causing the transistor to conduct and provide a low reset command logic signal at output 99. The values of resistors 85, 87 and 49b are selected so that indicator 25b provides no indication when control switch 23b is in grounded trip position. Also, the values of resistors 49b, 107 and 103 and Zenor diode 105 are selected so that indicator 25b provides no indication when control switch 23b is in reset position and the circuit breaker is reset. Also, the circuit parameters should be chosen so that only one transistor 75 or 93 conducts at any time.

The indicator circuit includes an NPN transistor 111 having an emitter 113 connected to ground and a collector 115 connected through a resistor 117 to single lead 47b and to lead 48. Transistor 111 also has a base 119 connected through a resistor 121 to ground and through a resistor 123 to the input 125 of the indicator circuit 29b. When a circuit breaker is tripped because of a malfunction in the associated circuit or by manual override a voltage signal appears at input 125 and current flows through resistors 123 and 121 to ground. A biasing voltage appears on base 119 of transistor 111 causing the transistor to conduct. With control switch 23b in reset position current flows from source $V_s$ through indicator 25b, single lead 47b, resistor 117 and transistor 111 to ground so that indicator 25b provides an indication that the circuit breaker has not been reset as commanded by control switch 23b.

One advantage of this arrangement is that if single lead 47b should open circuit neither a trip or reset command is provided by logic circuit 1b if the value of Zenor diode 105 is selected so that the potential at base 101 of transistor 93 is insufficient to provide a reset output.

The circuits described in FIGS. 1, 2 and 3 have a high noise level margin, that is, with the control switch in the reset position noise on the long single lead will not trip the circuit breaker and with the switch in the trip position or after an automatic trip has occurred the circuit breaker will not reset due to noise.

In FIG. 1, Zener diode 17 provides the noise level margin. When control switch 23 is in reset ground position transistor 3 is turned off by grounding the base current path through the control switch. However, for transistor 3 to turn on a voltage high enough to cause Zener diode 17 to conduct must be provided on single lead 47 or between the control switch ground and the transistor emitter ground. Zener diode 17 preferably has a value of approximately 15 volts so that a voltage of approximately 15 volts is required to change the state of the circuit.

In FIG. 2, when control switch 23 is closed, a path is provided for base current to flow from transistor 51. The base voltage supply preferably is 10 volts. Thus for base 61 to be biased off, a voltage high enough to stop base current flow is required so that the single lead 47 must be at a potential of approximately 10 volts to change the state of the circuit.

The arrangement shown in FIG. 3 is a combination of the arrangements shown in FIGS. 1 and 2. When control switch 23b is in grounded trip position, transistor 75 is turned on and transistor 93 is turned off. To turn off transistor 75 a voltage high enough to bias the base off is required. This is determined by the voltage V4 which preferably is approximately 10 volts. To turn transistor 93 on, a voltage high enough to cause Zener diode 105 to conduct base current is required and this is approximately 15 volts.

While the novel control circuits have been described as controlling circuit breakers, it should be understood that they may be used for controlling any device having two operating characteristics.

What is claimed is:

1. A control circuit for issuing commands to a device and for indicating whether the device has responded to a command, comprising control means for issuing the commands, a logic circuit including switching means controlled by the control means and providing logic signals corresponding to the commands for controlling the device, an indicator circuit including switching means operated by a signal when the device has not responded to a logic signal, and indicating means connected to said control means and to said indicator circuit and controlled thereby to indicate that the device has not responded to the command.

2. A circuit for issuing commands as described in claim 1 in which the control means is a manually operated switch.

3. A circuit for issuing commands as described in claim 1 in which the logic switching means is a transistor.

4. A circuit for issuing commands as described in claim 1 in which the indicator circuit switching means is a transistor.

5. A circuit for issuing commands as described in claim 1 in which the indicator circuit includes a voltage source for energizing the indicating means and energization of the indicating means is controlled by the control means and the indicator circuit.

6. A circuit for issuing commands as described in claim 1 including means for providing a signal to the indicator circuit when the device has not responded to a logic signal.

7. A circuit for issuing commands as described in claim 1 in which the control means and indicating means are remotely situated with respect to the remainder of the circuit and are connected thereto by a single lead.

8. A circuit as described in claim 7 having means for preventing issuance of a command should the single lead open circuit.

9. A circuit as described in claim 7 for use with circuit breakers and in which the logic signals correspond to trip and reset commands for tripping and resetting the circuit breakers.

10. A circuit breaker as described in claim 9 having means for providing a logic signal corresponding to a trip command for tripping the associated circuit breakers should the single lead open circuit.

11. A circuit as described in claim 1 in which the circuit has means for providing a high noise level margin.

12. A circuit as described in claim 11 in which the means for providing a high noise level margin is a Zener diode connected in the logic circuit for preventing operation of the switching means in response to noise.

13. A circuit as described in claim 11 in which the means for providing a high noise level margin is a biasing voltage on the switching means.

* * * * *